United States Patent [19]
Burton et al.

[11] 3,962,618
[45] June 8, 1976

[54] DIGITAL FOLLOWING ERROR MEASUREMENT SYSTEM

[75] Inventors: James M. Burton, Seattle; Jansey D. Tieden, Puyallup, both of Wash.

[73] Assignee: The Boeing Company, Seattle, Wash.

[22] Filed: Aug. 5, 1974

[21] Appl. No.: 494,969

[52] U.S. Cl. ............................ 318/561; 318/601; 340/268; 324/158 SY
[51] Int. Cl.² ...................................... G05B 13/00
[58] Field of Search ............ 318/561, 608; 340/268, 340/207 P; 324/158

[56] References Cited
UNITED STATES PATENTS

| | | | |
|---|---|---|---|
| 2,648,834 | 8/1953 | Lohse et al. | 340/268 |
| 2,747,162 | 5/1956 | Attura | 324/158 |
| 3,221,151 | 11/1965 | Cattel et al. | 318/561 X |
| 3,258,667 | 6/1966 | McDonough et al. | 318/608 X |
| 3,374,359 | 3/1968 | Anderson | 318/608 X |
| 3,519,904 | 7/1970 | Rogers | 318/608 |
| 3,555,252 | 1/1971 | Garden | 318/561 X |
| 3,624,642 | 11/1971 | Tripp | 318/608 X |
| 3,683,345 | 8/1972 | Faulkes et al. | 340/207 P |

*Primary Examiner*—B. Dobeck
*Attorney, Agent, or Firm*—Christensen, O'Connor, Garrison & Havelka

[57] ABSTRACT

A following error measurement system for phase analog servo systems is disclosed. The leading or lagging status of a phase analog servo system's command signal with respect to its feedback signal, is used to create a variable width error signal. This variable width error signal controls the counting of modulated command pulses received from the phase analog servo system. Since the frequency of the variable width error signal is proportional to the frequency of the modulated command pulses, the total count is normalized and a pulse weighted count is obtained. In addition, the conditioned variable width error signal controls the transfer of the pulse weighted count to a display system. Because the total count is normalized, the resultant display is also normalized for variations in the rate at which command pulses are applied to the phase analog servo system. Hence the measured following error is displayed.

10 Claims, 3 Drawing Figures

DIGITAL FOLLOWING ERROR MEASUREMENT SYSTEM

BACKGROUND OF THE INVENTION

This invention is directed to phase analog servo systems and, more particularly, to following error measurement systems for phase analog servo systems.

Phase analog servo systems have found a variety of uses in various fields, particularly in the numerically controlled machine tool field. While a wide variety of phase analog servo systems have been developed and are in use, they all operate in a similar manner. In general, a position command signal is phase compared with a feedback signal. The phase difference causes the movement of a shaft. A resolver connected to the shaft moves the feedback signal in the direction of phase balance. The position command signal may be continuously changing or may only command a shaft position change at desired points. In the former case, the actual shaft position is usually different than the "commanded" shaft position at any particular point in time. In the latter case, the actual shaft position may achieve the commanded position sometime subsequent to the command; however, during movement there still exists a difference between the commanded position and the actual position. This position difference is referred to as following error and may be a leading or lagging difference depending upon the direction of movement.

It is pointed out here that knowledge of following error is of extreme importance to users of phase analog servo systems. More specifically, as briefly noted above, phase analog servo systems are used to control the automatic operation of machines. Usually such systems are utilized to control several independent machine axes. The systems control various axis operations in accordance with a "program". The program creates position commands which in turn control the operation of the phase analog servo systems in the manner herein described. Since a following error exists in phase analog servo systems, this error must be matched between all axes of machine motion. If it is not, the desired machine accuracy will not be achieved. Thus, following error information is necessary to correctly adjust servo systems.

In many phase analog servo systems the position command signal is derived from a series of command pulses. The command pulses modulate the output of an oscillator in a manner such that the output of the modulator changes from a fixed quiescent frequency. The direction of change (increase or decrease) determines the commanded shaft direction change; the number of command pulses determines the amount of the change; and the command pulse rate determines the rate of shaft position change i.e., the velocity of shaft movement. In one specific form, the modulated pulses are counted by a command counter and the resultant pulse count forms the command signal. Because the modulated pulses change in frequency, the output of the command counter changes in frequency, as well as in phase. The unmodulated oscillator signal is counted down and then phase modified in accordance with the position of the shaft to form a feedback signal. The thusly obtained command and feedback signals are phase compared and form a variable width error signal whose width is related to the phase difference between the two signals.

The herein described invention is primarily adapted to measure the following error of phase analog servo systems of the general nature described above; however, it can be used to measure the following error of other types of phase analog servo systems if suitable modifications, obvious to a person of ordinary skill in the art, are made to the illustrated and described structure to obtain the requisite signals.

The most commonly used prior art method of measuring following error uses a standard oscilloscope. A varying width error signal, resulting from comparing the command signal with the feedback signal is displayed, using a fixed time base. The time base is adjusted manually so that a predetermined number of divisions (such as 10) across the screen on the horizontal axis is equal to a fixed amount of error (usually 0.2 inches). Because calibration changes as a function of velocity (rate of command pulse application), the time base must be recalibrated each time a different following error is to be measured (i.e., each time there is a change in the rate at which command pulses are applied). Thus, measurements using this method are time consuming and, therefore, expensive to make. In addition, the accuracy of the resultant measurement data is totally dependent upon the testing individual's ability to adjust (calibrate) and interpret the displayed signal. Thus it is desirable to provide a digital following error measurement system which eliminates the "human" element and more rapidly performs the desired measurement.

Therefore, it is an object of this invention to provide a following error measurement system.

It is also an object of this invention to provide a measurement system suitable for measuring the following error of phase analog servo systems.

It is still another object of this invention to provide a following error measurement system suitable for measuring the following error of phase analog servo systems that provides a direct display of following error, and does not require recalibration each time a change occurs in the rate at which command pulses are applied to the phase analog servo system being tested.

SUMMARY OF THE INVENTION

In accordance with principles of this invention, a digital following error measurement system suitable for measuring th error of phase analog servo systems is provided. The following error measurement system of the invention detects the variable width error signal generated by the phase analog servo system, and uses its width to control the counting of pulses whose frequency is related to the command signal frequency. Because the frequency of the variable width error signal is also related to the command signal frequency, the resultant count is normalized. Because the count is normalized, the inventive system does not have to be manually calibrated in accordance with the rate at which shaft position changes are commanded.

In accordance with further principles of this invention, the variable width error signal also controls the transfer of the pulse count to a display and the resetting of the counter counting the pulses.

In accordance with still other principles of this invention, the leading or lagging status of the phase analog servo system's position command signal, with respect to its feedback signal, controls the state of the variable width error signal detected by the following error measurement system. The thusly conditioned variable width error signal controls the transfer of the pulse count signal(s) to the display, and the resetting of the counter.

It will be appreciated from the foregoing brief summary that the invention provides a digital following error measurement system suitable for measuring the following error of phase analog servo systems. Because the counted pulses are normalized or weighted in accordance with the command signal rate the display is automatically calibrated. Thus, recalibration for changes in the velocity of the shaft are unnecessary whereby the invention can be used by relatively unskilled persons.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
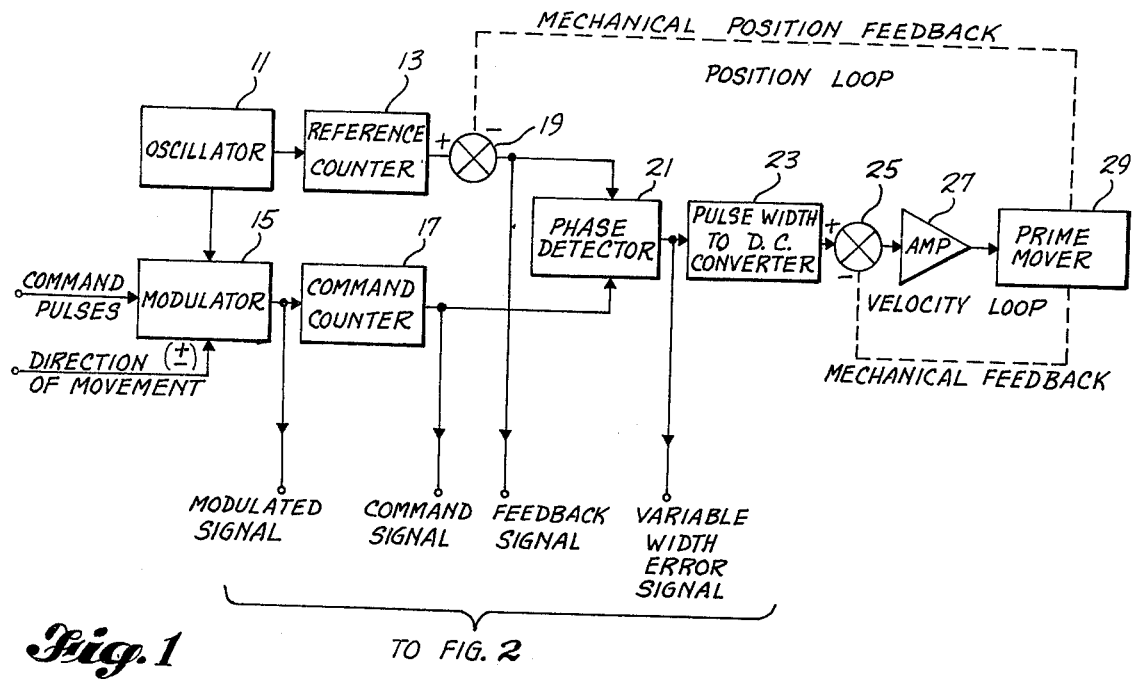
FIG. 1 is a block diagram illustrating one common type of phase analog servo system.

In order to better understand the invention, a brief description of a typical phase analog servo system and its operation is first provided. A typical phase analog servo system is illustrated in FIG. 1 and comprises: a fixed oscillator 11; a reference counter 13; a modulator 15; a command counter 17; a resolver 19; a phase detector 21; a pulse width-to-DC converter 23; a tachometer 25; an amplifier 27; and a prime mover 29.

The fixed oscillator 11 generates pulses at some predetermined frequency, such as 100 kHz, for example. This pulse chain is applied to the reference counter 13 and to the modulator 15. The modulator also receives a position command signal in the form of pulses (command pulses) and directional control from a suitable source, such as a controller/computer, for example. The command pulses are designed to ultimately cause the prime mover 29 to move its shaft and an associated mechanical system in one direction or the other. Thus, the command pulses "command" a position change. Depending upon the desired direction of shaft movement, the modulator 15 adds pulses to, or subtracts pulses from, the pulse chain received from the oscillator 11. The number of command pulses relates to the distance the shaft is to be moved and the command pulse rate is proportional to the desired rate or velocity of shaft movement.

The output of the modulator 15 is a pulse chain defined as the modulated signal and is applied to the command counter 17. Because the modulator output changes in frequency in accordance with the command pulses applied to it, the output of the command counter changes in both phase and frequency. The output of the command counter is defined as the command signal and is applied to one input of the phase detector 21.

The output of the reference counter 13 is connected to the signal input, designated plus (+), of the resolver 19. The output of the resolver 19 is defined as the feedback signal and is applied to the second input of the phase detector 21. The resolver 19 is a phase shifting device having a shaft whose position is controlled by the position of the shaft of the prime mover 29. The position of the resolver's shaft determines the amount of phase shift. The mechanical connection is illustrated in FIG. 1 by a dashed line designated mechanical position feedback. In this manner a position loop is formed. As will be understood by those skilled in the art, the resolver, when in motion, in addition to phase shifting the output of the reference counter also changes the frequency of that signal.

The output of the phase detector 21 is a variable width error signal whose frequency is related to the frequency of the command signal which in turn is related to the frequency of the modulated signal. The output of the phase detector is applied to the pulse width-to-DC converter 23. The output of the pulse width-to-DC converter is applied to the signal input, designated plus (+), of the tachometer 25. The shaft of the tachometer 25 is mechanically connected to the prime mover. In this manner a velocity loop is formed. The output of the tachometer 25 is applied through the amplifier 27 to the prime mover 29.

In operation, starting from a quiescent state, the occurrence of command pulses causes the output of the phase detector to indicate that an out-of-phase condition exists i.e., the output shifts from an in-phase state to an out-of-phase state. The width of this variable width error signal is related to the extent that the two signals (command and feedback) are out-of-phase. The pulse width-to-DC converter changes the variable width error signal into a DC voltage which drives the prime mover. As the shaft of the prime mover rotates it changes both the phase and the frequency of the feedback signal, bringing them toward the phase and frequency of the command signal. When these two signals again balance the shaft is at its "commanded" position and stops moving. If the command pulses continue or change, the shaft keeps "following" in an attempt to achieve the commanded position at any instant of time. As will be appreciated by those skilled in the art and others, until balance is achieved a following error exists between the commanded position and the actual position of the shaft of the prime mover, at any particular point in time. This invention is directed to measuring such following error. Information regarding following error is of extreme importance to users of phase analog servo systems because without knowledge of this parameter of these systems they cannot adequately adjust them so that a plurality act in the correct sequence to control one or more of the series of machine operations.

While the modulated command signal and the variable width error signals can take on a wide variety of frequency values, for purposes of discussion, using 100 kHz as the base frequency, the modulated signal is assumed to be variable such that its value is 100 kHz ± 33 kHz. The counters are assumed to divide their inputs by 2000, whereby the command the feedback signals are 50 Hz ± 8.3 Hz square waves with 50% duty cycles. Thus, the error signal is a 50 Hz ± 8.3 Hz square wave with a 0–100% duty cycle.

Figure 2:
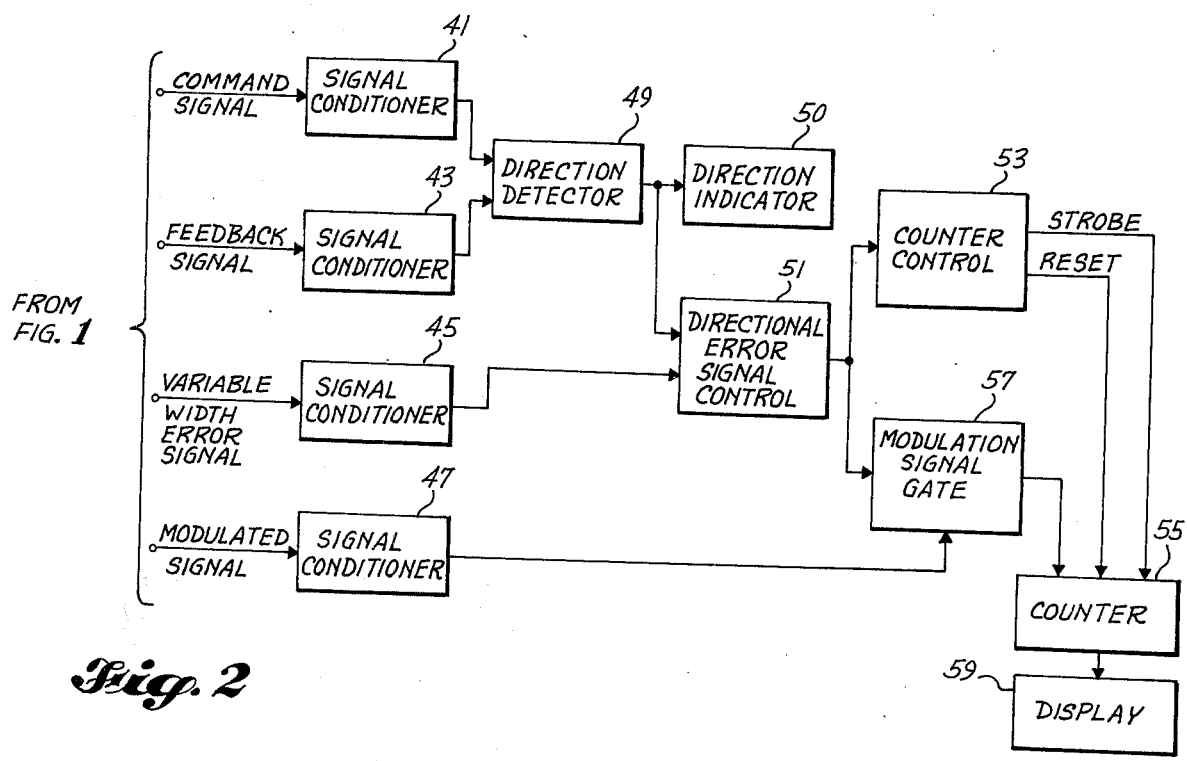
FIG. 2 is a block diagram illustrating a digital error following measurement system formed in accordance with the invention; and, FIG. 3 is a timing diagram of the signals which occur at various points in the digital following error measurement system illustrated in FIG. 2.

FIG. 2 is a block diagram illustrating a preferred embodiment of the invention and comprises: four signal conditioners 41, 43, 45 and 47; a direction detector 49; a direction indicator 50; a directional error signal control 51; a counter control 53; a counter 55; a modulation signal gate 57; and, a display 59.

The command signal, the feedback signal, the variable width error signal, and the modulated signal of the phase analog servo system to be tested are applied to the inputs of the first, second, third and fourth signal conditioners 41, 43, 45, and 47, respectively. The signal conditioners condition or set the level of these signals. In other words, the signal conditioner circuits: (1) alter voltage levels of the four signals received from the phase analog servo system; (2) square sine wave analog signals, if necessary; (3) invert for negative logic, if required; and, (4) provide high input impedance to isolate the following error measuring system from the phase analog servo system.

The output of the first and second signal conditioners 41 and 43 are applied to the inputs of the direction detector 49. The direction detector detects whether the command signal is leading or lagging the feedback signal and may take on various forms, one form being a logic NOR (or NAND) latch circuit wherein two NOR (or NAND) gates are cross coupled. The direction detector circuit is, thus, directed to determining the direction of movement of the shaft of the prime mover 29 with respect to the commanded direction of movement. In accordance therewith, the output of the direction detector is in either a logic 0 or a logic 1 state. The signal representing the state of the direction detector is applied to a control input of the directional error signal control and the direction indicator.

The variable width error signal, after being conditioned by the third signal conditioner 45 to create a bi-level variable width error signal, is applied to the second input of the directional error signal control. The directional error signal control may comprise a single logic gate. In accordance with the state of the output of the direction detector 49 (logic 0 or logic 1), the directional error signal control circuit either inverts or does not invert the variable width error signal. In this manner "direction" information contained in the variable width error signal is removed and only "distance" information retained. That is, informaton regarding the commanded direction of shaft movement is eliminated but information regarding the distance of shaft movement is retained.

Figure 3:
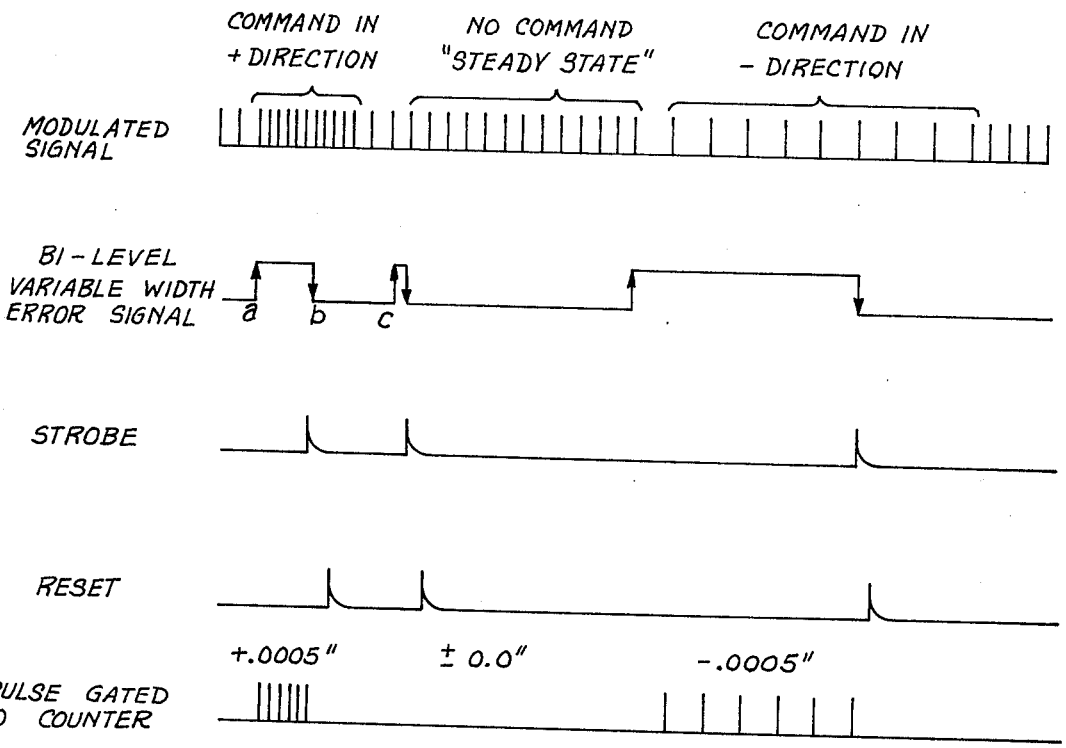

The thusly conditioned variable width error signal is illustrated in the second line of FIG. 3 and is applied to the counter control 53 and to one input of the modulation signal gate 57. The output of the fourth signal conditioner 47 is applied to the second input of the modulation signal gate. As can be seen from FIG. 3, the variable width error signal is either in a logic 1 or a logic zero state during a signal cycle (a-c). While either the logic 1 or the logic 0 state could be used to condition the modulation signal gate into a pulse passing state, for purposes of discussion it is assumed that the logic 1 state does so. Hence, from a to b the modulation signal gate passes signals and from b to c it does not pass signals. Thereafter, the cycle repeats. The amount of time the logic 1 state exists (the duty cycle) depends upon the phase error between the command and feedback signals i.e. the following error.

The pulse output of the modulation signal gate is applied to the counter 55. Thus, the counter counts the pulses passed during the period a to b. The counter control 53 applies strobe and reset pulses to the counter 55. A strobe pulse occurs immediately after the end of the pulse passing state of the variable width error signal i.e. point b. After a short time period, the counter control applies a reset pulse to the counter 55 which resets it to a zero or initial state. Thus, the counter control may be formed of a trigger circuit and a delay circuit.

The strobe pulse transfers the output of the counter to the display 59. The display includes a latch circuit or circuits adapted to store the output of the counter between strobe pulses. In this manner a display representing following error is produced. More specifically, the pulse passing width (a to b) of the variable width error signal, as discussed above, is related to following error. Thus, the number of pulses counted by the counter is related to following error. Hence, the readout displays the measured following error.

The following error, as displayed, is normalized or automatically calibrated to the command pulse rate. Specifically, the frequency of the modulated signal is related to command pulse rate. The frequency of the variable width error signal is also related to command pulse rate. Thus, as the command pulse rate increases so do the frequencies of both of these signals and vice versa. Because these signals are related in this manner, the command pulse rate has no effect on the following error display whereby the display does not have to be calibrated to take into account this effect (or more correctly it is automatically compensated to take into account command pulse rate).

While a preferred embodiment of the invention has been illustrated and described, it will be appreciated by those skilled in the art and others that various changes can be made therein without departing from the scope of the invention. For example, if the phase analog servo system to be tested does not in and of itself generate the required modulated, command, feedback and variable width error signals, suitable electronic devices can be included to produce these signals from the basic information generated by the phase analog servo system. In other words all phase analog servo systems generate the basic required information and the information generated can be, in most instances, readily placed in a form such that the following error can be measured by the invention. Moreover, for some phase analog servo systems direction detection may not be necessary because the variable width error signal need not be inverted i.e. it is always in the correct state. If such is the case, the portions of the invention directed to direction detection can be eliminated. Hence, the invention can be practiced otherwise than as specifically described herein.

The embodiments of the invention in which an exclusive property or privilege is claimed are defined as follows:

1. A digital following error measurement system for phase analog servo systems comprising:
   error detecting means suitable for connection to a phase analog servo system so as to detect the following error between a commanded position and an actual position and form a bi-level signal having a duty cycle related to said following error;
   signal detecting means suitable for connection to said phase analog servo system so as to detect a signal related to the commanded rate of position change an form a pulse chain having a frequency related to said commanded rate of position change;
   a signal gate means connected to said error detecting means and to said signal detecting means for passing said pulse chain during the period of time said bi-level signal is in one of its two states; and counting means connected to said signal gate for counting the pulses passed by said signal gate.

2. A digital following error measurement system for phase analog serve systems as claimed in claim 1 including:

display means connected to said counting means for displaying the pulse count counted by said counting means; and, counter control means connected to said error detecting means and to said counting means for applying strobe pulses to said counting means and causing the pulse count contained therein to be transferred to said display means, said strobe pulse occurring each time said bi-level signal moves from said one of its two states to the other of its two states.

3. A digital following error measurement system for phase analog servo systems as claimed in claim 2 wherein said counter control means also applies reset pulses to said counting means causing said counting means to be reset to an initial state, a reset pulse occurring immediately after each strobe pulse occurs.

4. A digital following error measurement system for phase analog servo systems as claimed in claim 3 wherein:

A. said phase analog servo system generates command and feedback signals, and a variable width error signal whose width is related to following error; and, B. said error detecting means includes:
1. a direction detector means for receiving the command and feedback signals generated by said phase analog servo system and determining the leading/lagging relationship between said command and the feedback signals, and,
2. a directional error signal control means connected to said direction detector means, and suitable for connection to said phase analog servo system so as to receive said variable width error signal, said directional error signal control means inverting or not inverting said variable width error signal in accordance with the leading/lagging status between said command and feedback signals, the output of said directional error signal control means being applied to said signal gate means and to said counter control means.

5. A digital following error measurement system for phase analog servo systems as claimed in claim 4 wherein:

A. said direction detector means includes:
1. a first signal conditioner suitable for connection to said phase analog servo system to receive said command signal and condition it;
2. a second signal conditioner suitable for connection to said phase analog servo system to receive said feedback signal and condition it; and,
3. a direction detector connected to the outputs of said first and second signal conditioners to receive the signals conditioned by said first and second signal conditions;

B. said directional error signal control means includes:
1. a third signal conditioner suitable for connection to said phase analog servo system to receive said variable width error signal and condition it into a suitable bi-level signal; and,
2. a directional error signal control circuit connected to the outputs of said direction detector and to said third signal conditioner to receive the variable width error signal conditioned by said third signal conditioner to a suitable bi-level signal; and, C. said signal gate means includes:
1. a fourth signal conditioner suitable for connection to said phase analog servo system to receive and condition a modulated signal comprising a pulse chain having a frequency related to the commanded rate of position change; and,
2. a modulation signal gate connected to the outputs of said fourth signal conditioner and said directional error signal control circuit, said modulation signal gate passing or inhibiting the passage of said modulated signal to said counting means in accordance with the state of said bi-level signal.

6. A digital following error measurement system for phase analog servo systems as claimed in claim 1 wherein:

A. said phase analog servo system generates command and feedback signals, and a variable width error signal whose width is related to following errors; and, B. said error detecting means includes:
1. a direction detector means for receiving the command and feedback signals generated by said phase analog servo system and determining the leading/lagging relationship between said command and the feedback signals; and
2. a directional error signal control means connected to said direction detector means, and suitable for connection to said phase analog servo system so as to detect said variable width error signal, said directional error signal control means inverting or not inverting said variable width error signal in accordance with the leading/lagging status between said command and feedback signals, the output of said directional error signal control means being applied to said signal gate means and to said counter control means.

7. A digital following error measurement system for phase analog servo systems controlled by command pulses and adapted to generate a modulated pulse signal whose pulse frequency is varied by said command pulses, a feedback signal, a command signal and a variable width error signal whose width is determined by the phase difference between said command and feedback signals, said digital following error measurement system comprising:

a direction detector suitable for receiving said command and feedback signals and determining the leading/lagging status of said command signal with respect to said feedback signal;

a directional error signal control circuit connected to the output of said direction detector and suitable for receiving said variable width error signal and inverting or not inverting said variable width error signal in accordance with the leading/lagging status of said command signal with respect to said feedback signal;

a modulation gate connected to the output of said directional error signal control circuit and suitable for receiving said modulated pulse signal and passing said modulated pulse signal during a period of time related to the duty cycle of said variable width error signal; and, a counter connected to the output said modulation signal gate so as to count pulses passed by said modulation signal gate.

8. A digital error following measurement system as claimed in claim 7 including a display connected to said counter for displaying the pulse count contained in said counter.

9. A digital following error measurement system as claimed in claim 8 including a counter control connected to the output of said directional error signal control circuit and having strobe and reset outputs connected to said counter, said strobe output causing said counter to transfer its output to said display when a strobe signal occurs and said reset output causing said counter to reset when a reset signal occurs, said strobe signal being generated at the end of the duty cycle of said variable width error signal and said reset signal being generated a short time period thereafter.

10. A digital following error measurement system as claimed in claim 9 including:
a first signal conditioner suitable for receiving said command signal and applying it to said direction detector;
a second signal conditioner suitable for receiving said feedback signal and applying it to said direction detector;
a third signal conditioner suitable for receiving said variable width error signal and applying it to said directional error signal control circuit; and,
a fourth signal conditioner suitable for receiving said modulated pulse signal and applying it to said modulation signal gate.

* * * * *